July 5, 1966   E. D. PADGETT   3,258,971
STRESS-STRAIN GAUGE
Filed Jan. 26, 1962
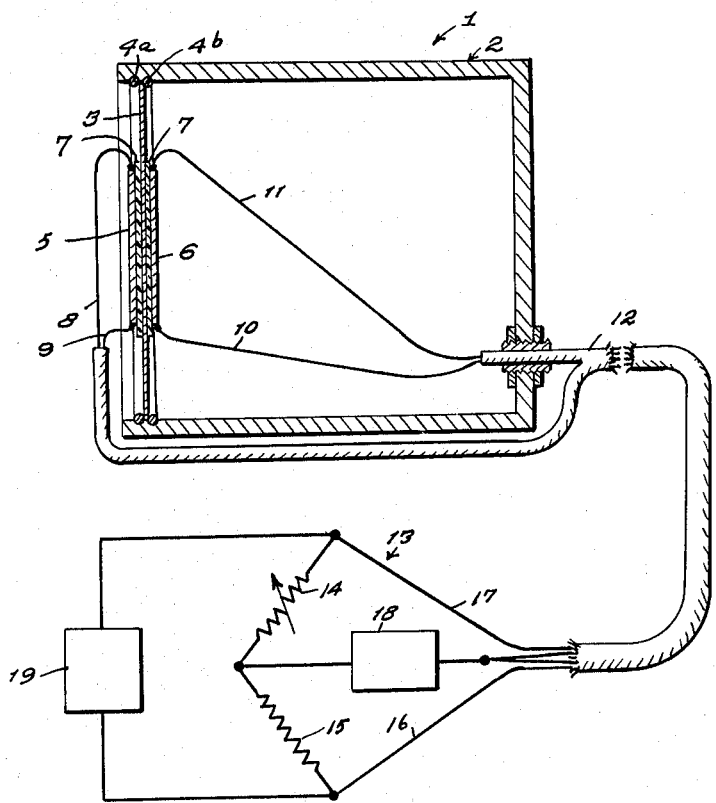
INVENTOR.
Edward D. Padgett
BY
S. J. Rotondi & A. J. Dupont 3,258,971
STRESS-STRAIN GAUGE
Edward D. Padgett, Morristown, N.J., assignor to the United States of America as represented by the Secretary of the Army
Filed Jan. 26, 1962, Ser. No. 169,152
2 Claims. (Cl. 73—398)

The invention described herein may be manufactured and used by or for the Government for governmental purposes without the payment to me of any royalty thereon.

This invention relates to an apparatus for measuring and determining conditions in a physical medium such as tension, compression, or deformation resulting from changes in load, changes in temperature, and the like; and more particularly to such apparatus utilizing a piezoresistive device whose resistance changes as a function of the condition to be measured, and by the measurement of which, the unknown condition may be determined.

In many mechanical constructions, and particularly in ordnance, metallic components are subjected in service to deformations, both in the elastic and plastic range, at rates of strain far in excess of that which can be read and recorded using conventional strain gauge means. To obtain the stress-strain properties of such devices by subjecting them to stresses in a high speed testing machine presents unusual problems of measuring and recording which cannot be readily overcome. Another difficulty encountered where the acoustic impedance of gases are to be measured is that the magnitude of this resistance due to the movement of the gas is extremely small and may be of the same order of magnitude, or smaller, than the resistive component representing the inherent losses of the transducing stress-strain gauge itself.

It is one object of the present invention to provide a gauge constructed of a new type material that has a higher gage factor than conventional materials now used in stress-strain gauges.

Still another object of the invention is to provide a device for measuring the movement of a gas even at low pressures, whereby the said device may serve as a vacuum gauge.

Yet another object of this invention is to provide a stress-strain gauge that will operate at high speeds and with great accuracy.

Other and further objects of the present invention will become apparent and the foregoing will be best understood from the following description of an exemplification thereof, reference being had to the drawing in which the figure shows one form of the stress-strain gauge, constructed in accordance with the present invention, connected to a measuring circuit.

In accordance with this invention the physical quantities to be measured, i.e., the stress applied to the test specimen and the resulting change in diameter or length of the specimen, are correlated to deformations respectively produced in each of two piezo resistive elements. It has been found that the piezo resistive properties of semiconductor materials such as silicon, indium antimony or silicon carbide can be used for the fabrication of new and improved integrated sensor elements, the strain-resistance properties of which have been found to be much greater than the strain-resistance properties of other materials heretofore used in the manufacture of stress-strain gauges. An improvement of from 50–75 to 1 in gage factors over the factors of conventional wire gauges have been readily obtained using piezo resistive materials and, properly fabricating a gauge using silicon or silicon carbide as the resistive material, it is possible to obtain a gage factor as high as 160 to 170 depending on the method of fabricating and integrating the orientation of the semiconductor material. When the gage factor of this semiconductor material is compared to the usual gage factor of from 2 to 4, obtained with conventional materials, it becomes readily apparent that far superior gauges may be obtained by using a gauge constructed of a semiconductor material.

Although other geometric shapes and crystal orientations can be used in constructing a semiconductor stress-strain element, it has been found that excellent results are obtained if the element is of a thin whisker or flat filament shape formed by single crystals orientated with one another and essentially free of voids and other defects. The whiskers or filaments need not be circular in diameter but may have any desired cross sectional shape such as, for example, an oval or flat configuration. It has been found possible to fabricate whiskers or filaments having a diameter of from one to two mils and from about 1/16 to over 1/4 of an inch in length. These dimensions are by way of example only and are not intended to limit the size that may be obtained by proper methods of fabrication.

Suitably fabricated sensor elements constructed of semiconductor material can be used for making both static and dynamic measurements as may be desired. Also, because the sensor elements are small in size and have such high gauge factors, these active elements make possible a new family of microminiature components for measurement of force, torque, and pressure as well as vibration, shock, acceleration, acoustical and other phenomena. It has also been found that sensor elements made of semiconductor materials may be substituted for existing wire or other type sensor elements in presently existing stress-strain devices thus improving their overall performance.

Another advantage of sensors made of a semiconductor material is their ability to accept either alternating, pulsed, or direct currents or voltages as may be required by the particular measurement equipment with which the sensor elements are being used. These sensor elements also permit the measurements to be referenced to a direct current or voltages thus permitting a distinct advance in the use of stress-strain gauges. This allows, for example, dynamic measurements to be made at very low frequencies (essentially at zero to 5 or 10 cycles per second).

In the drawing there is shown one form of a stress-strain gauge using semiconductor sensor elements. In this figure there is illustrated a sectional view of a vacuum gauge, shown generally at 1, constructed of a hollow airtight housing or container 2 which has been evacuated in order to form a device that will respond to changes in atmospheric pressure. The open end of the housing is covered by a thin, flexible metallic diaphragm 3 held in place by two "C" clamps 4a and 4b. Secured to either side of the diaphragm are semiconductor sensor elements 5 and 6. These elements may be secured to the diaphragm by atomic integration or by using a suitable bonding and insulating material 7 such as silicon semiconductor polymer which serves to both hold the elements in place and to insulate the elements from the diaphragm. If the diaphragm is made of an insulative material such as, for example, a pre-fired ceramic-metal mixture, the sensor elements may be secured to the diaphragm by a thin film of molten metal which is allowed to solidify. The complete sensor element may be partly or completely embedded in a plastic material for additional mechanical support if such is desired. Thin gold or gold-copper alloy wire leads 8–11 may be fired to the ends of the semiconductor sensor elements and these wires are fed through the cable 12 to a Wheatstone bridge circuit designated generally as 13. A portion of the cable 12, carrying leads 10 and 11 passes through an air tight seal (not numbered) in the container 2.

Additional semiconductor element (not shown) may be included in the circuit for compensation purposes if such is desirable.

The Wheatstone bridge circuit is constructed with four arms 14–17 as is the usual case. The arm 14 has a variable resistor connected therein which may be varied to balance the current or voltage flow through the bridge. The arm 15 consists of a fixed resistor while the arms 16 and 17 are made up of the semiconductor sensor elements 5 and 6. The sensor elements are each incorporated in a separate arm of the Wheatstone bridge circuit so that the resistance change of the gauges will be translated to the bridge thereby causing the bridge to become unbalanced and thus causing a potential to appear across the output circuit 18 of the bridge. The output circuit may be either a meter type arrangement, a comparison circuit or a memory type circuit. The input 19 to the bridge may be an alternating, pulsed, or direct current or voltage depending on which is more desirable in terms of the output circuit since, as stated above, the sensor elements work equally well regardless of the type of power applied to the circuit.

The operation of the stress-strain gauge and the circuit may be described briefly as follows. As the atmospheric pressure varies, a pressure is exerted upon the diaphragm 3. Assuming that the atmospheric pressure is increasing, this will cause the semiconductor element 5 to be placed under a compressing force while the semiconductor element 6 placed under a force that tends to elongate the element. These forces cause the resistance of element 5 to decrease while the resistance of element 6 will increase. The magnitude of the resistance change is essentially the same for both elements but of opposite polarity. Since the sensor elements 5 and 6 form two arms of the Wheatstone bridge circuit, the change in their value will cause the bridge to become unbalanced and an output signal will be registered in unit 18. The polarity and the strength of the signal will indicate to what extent and in which direction the atmospheric pressure is varying.

While I have described my semiconductor sensor elements in conjunction with one arrangement, it is obvious that other arrangements utilizing my sensor elements are possible. It should also be realized that the sensor elements themselves may be made by various methods and may take different shapes as may be required by the particular use to which they are to be put. For example, the sensor elements may be ground to some desired shape before attaching them to the element to be tested. It is also possible to adapt these type sensor elements to accelerometers, fuzing and arming devices, and other torque sensing or measuring devices. It is accordingly desired that my invention be given a broad interpretation commensurate with the scope of the appended claims and the status of my invention within the art.

What is claimed is:

1. Apparatus for measuring the change in an external condition, comprising a container having an open end, a flexible diaphragm secured over and sealing at the periphery said open end to permit the evacuation of air within the container, a piezo-electric condition sensing element bonded to the inside of the flexible diaphragm and spaced from said periphery thereof, a second sensing element of opposite polarity bonded in a corresponding position on the outside of the diaphragm, each element having a piezo resistance value responsive to a change in air pressure on respective sides of said flexible diaphragm for separate measurement of the air pressure at each element, separate lead-out wires connected to each sensing element and electrical means connected to said lead-out wires for balancing normal atmospheric pressure exerted on the flexible diaphragm after the container has been evacuated and for measuring thereafter the change in external air pressure.

2. Apparatus for measuring the change in atmospheric pressure, comprising a container having an open end, a flexible diaphragm secured over and sealing at the periphery said open end to permit the evacuation of air within the container, piezo-electric condition sensing element bonded to the inside of the flexible diaphragm and spaced from the periphery of said diaphragm, a second sensing element of opposite polarity bonded in a corresponding position on the outside of the diaphragm, each element having a piezo resistance value responsive to a change in different conditions on respective sides of said flexible diaphragm for separate measurement of the air pressure at each element, separate lead-out wires connected to each sensing element, a bridge circuit having a separate arm connected through the lead-out wires to each sensing element, a power source connected to the bridge circuit, said bridge circuit being first balanced for the deformation of the inwardly flexed diaphragm and sensing elements due to evacuation of said container and read out means across the bridge circuit for thereafter measuring any change in pressure externally of the container as indicated by the change in the piezo resistance of said outside sensing element.

References Cited by the Examiner

UNITED STATES PATENTS

| | | | |
|---|---|---|---|
| 1,636,921 | 7/1927 | Nicolson | 310—8.7 X |
| 2,558,563 | 6/1951 | Janssen | 310—8.8 X |
| 2,894,457 | 7/1959 | Severance | 102—70.2 |
| 2,939,317 | 6/1960 | Mason | 73—517 |
| 2,979,680 | 4/1961 | Bean | 73—88.5 X |
| 3,034,345 | 5/1962 | Mason | 73—88.5 X |

BENJAMIN A. BORCHELT, *Primary Examiner.*

ARTHUR M. HORTON, SAMUEL FEINBERG,
*Examiners.*

L. L. HALLACHER, M. F. HUBLER,
*Assistant Examiners.*